United States Patent Office 3,132,189
Patented May 5, 1964

3,132,189
PREPARATION OF 1,2,4,5-TETRAALKYL-BENZENES FROM PSEUDOCUMENE AND PROPYLENE
Eugene F. Lutz, Denver, Colo., assignor to Marathon Oil Company, Findlay, Ohio, a corporation of Ohio
No Drawing. Filed July 17, 1961, Ser. No. 124,320
2 Claims. (Cl. 260—671)

This invention relates to a process for the selective synthesis of 1,2,4,5-tetraalkylbenzenes in the presence of a moist aluminum chloride catalyst. More specifically, this invention relates to the preparation of 1-isopropyl-2,4,5-trimethylbenzene and 1,2,4,5-tetramethylbenzene (durene) as the predominant products from the alkylation of pseudocumene with propylene in the presence of a moist aluminum chloride catalyst.

1,2,4,5-tetraalkylbenzenes are of interest as intermediates for the preparation of pyromellitic dianhydride, a valuable chemical in the synthesis of numerous plasticizers, resins, and polymeric films. The 1,2,4,5-tetraalkylbenzenes may be oxidized by nitric acid and other common oxidizing agents to the corresponding tetrabasic acid which can readily be converted to pyromellitic dianhydride.

According to the present invention I have discovered that pseudocumene may be alkylated with propylene in the presence of a moist aluminum chloride catalyst to produce an alkylate whose composition is at least 60% 1,2,4,5-tetraalkylbenzenes. 1-isopropyl-2,4,5-trimethylbenzene accounts for about 43-54% of the 1,2,4,5-tetraalkylbenzenes formed, while 1,2,4,5-tetramethylbenzene (durene), formed by transmethylation during the alkylation reaction, accounts for about 5-15% of the 1,2,4,5-tetraalkylbenzenes. Both durene and 1-isopropyl-2,4,5-trimethylbenzene are readily converted to pyromellitic dianhydride.

Included among the objects and advantages of the present invention is a process for the selective production of 1,2,4,5-tetraalkylbenzenes by the alkylation of pseudocumene with propylene in the presence of a moist aluminum chloride catalyst. The process provides an alkylation catalyst which will selectively produce 1,2,4,5-tetraalkylbenzenes in relatively high yield. This process provides an inexpensive and highly efficient method for producing certain intermediates and useful compositions by alkylating an inexpensive and readily available petroleum product.

A primary advantage of this process over those already known is in the selectivity with which inexpensive petrochemicals may be converted to 1,2,4,5-tetraalkylbenzenes in high yield. D. A. McCaulay has shown in U.S. Patents No. 2,803,681 and 2,848,511 that when tetramethylbenzenes are synthesized by the disproportionation of trimethylbenzenes, such as pseudocumene, in the presence of an ordinary Friedel-Crafts catalyst, low conversion yields (10-30%) must be taken in order to maintain a reasonably high percentage of 1,2,4,5-tetramethylbenzene (durene) in the product mixture of tetramethylbenzenes. When higher conversion yields are taken, an equilibrium mixture of tetramethylbenzenes is obtained which has approximately the following composition: 50% isodurene (1,2,3,5-tetramethylbenzene), 45% durene (1,2,4,5-tetramethylbenzene) and 5% prehnitene (1,2,3,4-tetramethylbenzene). This work clearly illustrates the difficulty involved in trying to prepare a 1,2,4,5-tetramethylbenzene in high yield in the presence of an ordinary Friedel-Crafts catalyst.

Still other patents report the alkylation of pseudocumene with such relatively expensive alkylating agents as methanol and methyl chloride, for example U.S. Patent No. 2,945,899.

The process of this invention provides a process for producing 1,2,4,5-tetraalkylbenzenes in yields of 60% and higher which utilizes inexpensive starting materials and relatively mild reaction conditions.

These and other objects and advantages will be readily apparent by referring to the following examples which present several modes for carrying out the invention but not by way of limiting the invention to the precise details set forth.

Example I

To about 12 grams (0.1) of pseudocumene was added about 1.4 grams of aluminum trichloride and about 0.5 gram of water in a three-necked flask, equipped with a condenser, thermometer, stirrer, and gas bubbler. The mixture was heated to about 85-90° C. and after reaching that temperature propylene gas was passed into the solution at a rate of about 37 cc. per minute. The course of the reaction was followed by gas-liquid chromatographic analysis of small aliquots of the reaction mixture taken at regular intervals. After a period of about two hours the reaction was terminated, the reaction mixture was cooled, and the catalyst removed by filtration. Gas-liquid chromatographic analysis showed that one compound accounted for about 84% of the reaction mixture. Distillation through a glass helices packed column gave the following fractions:

$n^{22}=1.5209$, 1st=68-100° C./19 mm. (0.6 g.)
$n^{22}=1.5048$, 2nd=100-104° C./19 mm. (1.4 g.)
$n^{23}=1.5043$, 3rd=104-108° C./19 mm. (7.4 g.)
$n^{22}=1.5111$, residue=clear liquid (3.3 g.)

Due to the closeness of the boiling point, the second and third cuts were considered essentially pure 1-isopropyl-2,4,5-trimethylbenzene obtained in a yield of about 54.3%. The structure of the product was established by ultraviolet, infrared and nuclear magnetic resonance spectra. In addition the molecular weight and physical constants checked with the known values of the compound, 1-isopropyl-2,4,5-trimethylbenzene.

Example II

Following the procedure of Example I about 96 grams of pseudocumene, about 11.2 grams of aluminum trichloride and about 4 grams of distilled water were placed in a vessel and heated to 85-90° C., after which propylene was bubbled into the reaction mixture at a rate of about 60 cc. per minute. The reaction was carried out for a period of about 5 hours, and the reaction mixture was then cooled, and filtered. The cooled mixture was washed with a 20% sodium carbonate solution, then with water and dried over anhydrous potassium carbonate. The product weighed about 107 grams. Distillation showed that the product consisted of about 15.5% of durene (1,2,4,5-tetramethylbenzene) and about 43.3% of 1-isopropyl-2,4,5-trimethylbenzene, giving a total yield of about 58.8% of 1,2,4,5-tetraalkylbenzenes.

Example III

Following the above procedure, about 48 grams of pseudocumene, about 5.6 grams of aluminum trichloride and about 2 grams of distilled water were heated to a temperature of 85-90° C. and after establishing the reaction temperature, propylene was bubbled into the reaction mixture at a rate of about 60-85 cc. per minute. The reaction was carried out for a period of about three and a half hours after which time the mixture was cooled and filtered. The reaction solution weighed about 64.4 grams whereas the expected weight if all the reactivants were converted to the tetraalkylbenzene would be 64.8 grams.

The reaction of the invention may be carried out at temperatures generally below the boiling point of pseudocumene and generally in the range of 70–150° C. It is preferable, however, to react the propylene with the pseudocumene in a temperature range of 80–90° C. The moist aluminum chloride is present in catalytic amounts so as to selectively alkylate the pseudocumene with the propylene in the 5 position.

While the reaction has been described with reference to specific examples there is no intent to limit the invention to the precise details so set forth, except as defined in the following claims.

I claim:

1. A process for the preparation of a high yield of mixed 1,2,4,5-tetraalkylbenzenes which comprises heating pseudocumene with propylene in the presence of a catalytic amount of moist aluminum trichloride for a period of from one to five hours and in a temperature range of about 80–90° C., and then separating from the reaction mixture a mixture of 1-isopropyl-2,4,5-trimethylbenzene and 1,2,4,5-tetramethylbenzene.

2. A process for the preparation of a high yield of 1-isopropyl-2,4,5-trimethylbenzene which comprises heating pseudocumene in the presence of a catalytic amount of moist aluminum trichloride in a temperature range of from about 70–150° C., and bubbling propylene through the heated mixture for a period of from one to five hours, and then separating from the reaction mixture a mixture containing a major portion of 1-isopropyl-2,4,5-trimethylbenzene and a minor portion of 1,2,4,5-tetramethylbenzene.

References Cited in the file of this patent

UNITED STATES PATENTS

| | | |
|---|---|---|
| 2,740,819 | Kirkland | Apr. 3, 1956 |
| 2,882,324 | Schmerling | Apr. 14, 1959 |